Nov. 22, 1938.       E. L. WOOD       2,137,434
BEARING AND SUPPORT
Filed June 26, 1936
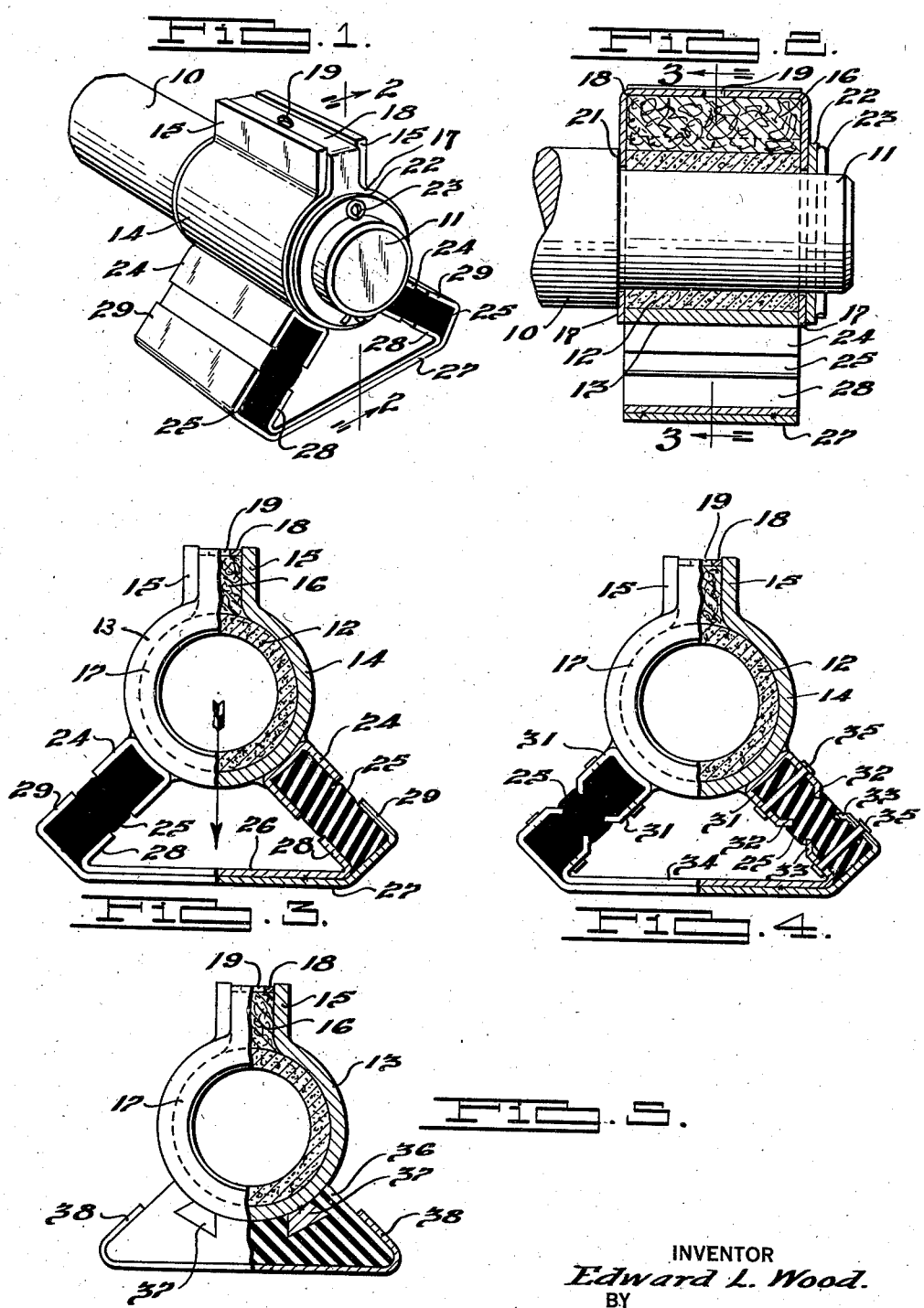
INVENTOR
Edward L. Wood.
BY
Harness, Dickey, Pierce & Hann
ATTORNEYS.

Patented Nov. 22, 1938

2,137,434

UNITED STATES PATENT OFFICE 2,137,434

BEARING AND SUPPORT

Edward L. Wood, Detroit, Mich., assignor to Gar Wood Industries, Inc., a corporation of Michigan Application June 26, 1936, Serial No. 87,344

6 Claims. (Cl. 308—26)

My invention relates to bearings and their method of support, and particularly to a free-floating, self-aligning bearing and housing which provides positive support for a shaft.

Bearings of the sleeve type are usually press-fitted in an aperture in a support and difficulty was always experienced in having the sleeves mounted in accurate alignment. The aperture in the support, when oversized, did not provide a sufficient coefficient of friction to retain the bearing from turning relative to the support, and when the aperture was too small, the forcing of the sleeve thereinto would cause the sleeve to be distorted and reduced in diameter.

In practicing the present invention, I overcome the difficulties heretofore experienced with bearings of the sleeve type by fabricating a unique support for the sleeve. The support embodies in the main, a metal strap which is formed annularly, having the ends spaced and projected to provide spaced flanges. The inner diameter of the strap so formed is less than the outer diameter of the sleeve so that the flange portions must be spread apart to permit the sleeve to be moved longitudinally within the arcuate portion of the strap. When the flanges are released, the sleeve bearing is gripped with a desirable amount of friction which prevents its turning relative to the strap. The sleeve is mounted in rubber on the side opposite to the load and a felt pad is preferably disposed between the projecting flanges. A U-shaped element has a web that rests on top of the felt between the flanges and two parallel washerlike extensions covering the ends of the sleeves to form thrust washers. A hole is provided in the web portion through which a lubricant may be introduced into the pad. The sleeve bearing is preferably of sintered composition well known in the art, having lubricating properties inherently embodied therein and which is sufficiently porous to permit the lubricant introduced through the aperture into the pad to saturate the body of the sleeve.

Accordingly, the main objects of my invention are: to provide a support which frictionally engages a sleeve bearing; to provide a frictional support for a sleeve bearing, the circumference of which may be enlarged to permit the insertion and removal of the sleeve therefrom; to provide a support for a bearing made from a strap having the central portion of arcuate shape with the ends extended in spaced parallel relation; to provide projecting flanges on a support for a sleeve bearing which may be spread apart to release the sleeve or permit the sleeve to be introduced within the support; to provide a support with spaced flanges in which a lubricant absorbing pad may be disposed; to provide thrust washers on both sides of a sleeve bearing which are joined by a web; to provide a support for a bearing having spaced projecting flanges in which a web joining thrust washers is disposed to cover an oil pad positioned between the flanges; to mount a support for a bearing on rubber to permit the support to float; and, in general, to provide a support for a sleeve bearing which is simple of construction, which eliminates machined parts, and which is economical of manufacture.

Other objects and features of novelty of my invention will be either specifically pointed out or become apparent when referring, for a better understanding of my invention, to the following description taken in conjunction with the accompanying drawing, wherein:

Figure 1 is a perspective view of a bearing and support for a shaft embodying features of my invention;

Fig. 2 is an enlarged sectional view of the structure illustrated in Fig. 1, taken on the line 2—2 thereof;

Fig. 3 is an end view, partly in section and partly in elevation, of structure illustrated in Fig. 2, taken on the line 3—3 thereof;

Fig. 4 is a view of structure, similar to that illustrated in Fig. 3, showing a modified form thereof; and Fig. 5 is a view of structure, similar to that illustrated in Figs. 3 and 4, showing a further modified form which my invention may assume.

Referring to Figs. 1, 2 and 3, I have illustrated a shaft 10 having a bearing engaging end portion 11 supported by a sleeve bearing 12 in a support 13. The bearing 12 may be of any well known sleeve type, but is herein illustrated as being of the sintered type, known in the trade as "oilight", which is porous and self-lubricating. The support 13 embodies a piece of strap material having a certain amount of resiliency which has its main central portion bent into circular shape, as at 14 in Fig. 3, with the ends 15 outwardly projected in spaced parallel relation. Between the projecting portions 15 of the support 13, I preferably employ a pad 16 which will absorb oil or similar lubricant and which may be made of felt, woven or other type of absorbent material.

End thrust washers 17 are joined by a web 18 which is disposed upon the pad 16 between the extending portions 15 of the support 13. The thrust washers are retained as a unit in this manner, while web 18 forms a cover for the pad through an aperture 19 of which a lubricant is introduced.

In Fig. 2, the thrust washers 17 are illustrated as being engaged by a shoulder 21 on the shaft 10 and by a washer 22 which is retained on the end of the shaft by a cotter pin 23. The oil introduced to the pad through the aperture 19 will saturate the porous material forming the bearing sleeve 12. When a bronze sleeve is employed, oil grooves and apertures will be employed therein into which oil from the pad will be introduced.

Referring more particularly to Fig. 3, I have illustrated a pair of outwardly presented channels 24 welded or otherwise secured to the support 13 having their central planes passing through the axis of the shaft. Rubber blocks 25 are secured in the channels 24 by vulcanization or by other methods or means well known in the art. A pair of plates 26 and 27 form a base, the ends 28 and 29 of which are flanged inwardly in such manner as to form a channel aligned with the channels 24. The flanges 28 and 29 receive the opposite end of the rubber blocks 25 and are secured thereto to form a unit. The web portions of the flanges 26 and 27 may be secured together by welding, brazing, riveting, or by other means.

In Fig. 4, I have illustrated channels 31 which are similar to the channels 24 with the exception that the ends 32 are flanged inwardly to more firmly grip the rubber blocks 25 or to register within slots which may have been provided therein. Flanges 33 on the ends of base 34, made up of plates similar to plates 26 and 27, are extended inwardly to engage the rubber blocks in a similar manner. In addition, rivets 35 may be employed extending through the flanges and rubber blocks to further secure the blocks to the channel. The rubber blocks are anchored to their supports in this manner without vulcanization although vulcanization could also be employed with the structure illustrated.

Referring to Fig. 5, I have shown a further mounting method for the support 13, embodying a solid block 36 of rubber which is vulcanized to the support and to suitable anchor elements 37 provided thereon. These anchor elements may be welded or otherwise secured to the support and are herein illustrated as being dovetail strips which provide greater anchoring surfaces. Projecting pins having heads or recessed slots well known in the art could also be utilized. Encompassing the lower portion of the rubber block 36, a metal sheath 38 is utilized which may frictionally engage and/or be vulcanized thereto.

A support built up in this manner is embodied with resiliency so that the bearing need not be accurately aligned since it will align itself with the shaft which it supports. The supporting portion 13 has the arcuate portion 14 of smaller inner diameter than the outer diameter of the sleeve. By spreading the projecting ends 15, the inner surface of the arcuate portion 14 will have a greater diameter than the outer diameter of the sleeve so that the sleeve may be longitudinally moved into the support. When the ends 15 are released, the sleeve bearing 12 will be gripped with sufficient friction to prevent it from rotating relative to the support. The pad 16 is then disposed between the projecting portions 15 and the web 18 placed thereon with the projecting thrust washers 17 aligned with the sleeve bearing 12. The bearing is so mounted as to have the load operating against the rubber blocks 25 or the single block 36 and a complete resilient support is provided thereby. The bearing support constructed in this manner is fabricated entirely from stampings, thereby entirely eliminating machined parts. An extremely durable and improved support is provided for the sleeve which is resiliently mounted and provides self-aligning features.

While I have illustrated and described several embodiments of my invention, it will be apparent to those skilled in the art that various changes, omissions, additions and substitutions may be made therein without departing from the spirit and scope of my invention as set forth in the accompanying claims.

I claim as my invention:—

1. The combination with a sleeve bearing having a circumferentially uninterrupted wall, of a support therefor having an arcuate body portion and spaced end portions, a felt pad disposed between said spaced end portions, and a pair of connected thrust washers disposed over the end faces of said bearing.

2. The combination with a sleeve bearing having an uninterrupted wall, of a support therefor having an arcuate body portion and spaced end portions, a felt pad disposed between said spaced end portions, and a pair of connected thrust washers disposed over the end faces of said bearing, said connected portion extending over said pad.

3. The combination with a sleeve bearing having an uninterrupted wall, of a support therefor made of strap material having the central portion of arcuate shape, the inner surface of which is of less diameter than the outer diameter of the sleeve bearing, the ends of the strap being projected to form means whereby the arcuate body portion may be spread to permit the insertion and removal of the bearing, and a lubricating pad disposed between said projecting ends.

4. The combination with a sleeve bearing having an uninterrupted wall, of a support therefor made of strap material having the central portion of arcuate shape, the inner surface of which is of less diameter than the outer diameter of the sleeve bearing, the ends of the strap being projected to form means whereby the arcuate body portion may be spread to permit the insertion and removal of the bearing, a lubricating pad disposed between said projecting ends, and a pair of thrust washers having a connecting web disposed over said pad with the washers aligned with the bearing.

5. A sleeve bearing having an uninterrupted wall, in combination with a support having a slot therein, a pad disposed in said slot, and a web disposed over said pad having at its ends thrust washers for said bearing.

6. The combination with a sleeve bearing having an uninterrupted wall, of a support therefor made of strap material formed in arcuate shape, the inner surface of which is normally of less diameter than the outside diameter of the sleeve bearing so as to resiliently embrace and retain said bearing, and a rubber mounting for said bearing support.

EDWARD L. WOOD.